United States Patent [19]

Betti et al.

[11] Patent Number: 5,416,628
[45] Date of Patent: May 16, 1995

[54] MULTILEVEL COHERENT OPTICAL SYSTEM

[75] Inventors: Silvello Betti; Franco Curti; Giancarlo De Marchis; Eugenio Iannone, all of Rome, Italy

[73] Assignee: Fondazione Ugo Bordoni, Rome, Italy

[21] Appl. No.: 946,333
[22] PCT Filed: May 6, 1991
[86] PCT No.: PCT/IT91/00036
§ 371 Date: Nov. 9, 1992
§ 102(e) Date: Nov. 9, 1992
[87] PCT Pub. No.: WO91/18455
PCT Pub. Date: Nov. 28, 1991

[30] Foreign Application Priority Data

May 11, 1990 [IT] Italy .................. 47949/90

[51] Int. Cl.$^6$ .................................. H04B 10/06
[52] U.S. Cl. ..................... 359/181; 359/183; 359/188; 359/192; 359/156
[58] Field of Search ........... 359/156, 192, 181, 183, 359/188

[56] References Cited

U.S. PATENT DOCUMENTS

| 3,752,992 | 8/1973 | Fluhr | 359/183 |
| 4,436,376 | 3/1984 | Fergason | 359/156 |
| 4,831,663 | 5/1989 | Smith | 359/192 |
| 5,008,958 | 5/1991 | Cimini | 399/192 |

FOREIGN PATENT DOCUMENTS 0277427 8/1988 European Pat. Off. .
0280075 8/1988 European Pat. Off. .

OTHER PUBLICATIONS

Niblock, "Polarization and Demodulation of Light", Applied Optics, 2-64, vol. 3 #2, pp. 277-279.
Hodgkinson, "Polarization Insensitive Heterodyne Detection Using Polarization Scrambling" Electronic Letters, vol. 23 #10 pp. 513-514.
Benedetti, et al., "Performance Evaluation of Multilevel Polarisation Shift Keying Modulation Schemes", Electronics Letters, vol. 26, No. 4, pp. 244-246, Feb. 15, 1990, Stevenage, GB.

Primary Examiner—Leslie Pascal
Attorney, Agent, or Firm—Staas & Halsey

[57] ABSTRACT

A multilevel coherent optical system, including a heterodyne transmitter and receiver, in which a multilevel signal with a coherent optical carrier is provided by modulating the phase and the polarization of the electromagnetic field propagating through a single-mode optical fiber. The transmitter comprises a coherent light source providing the optical carrier, a phase modulator modulating the phase of the carrier, a polarization modulator, and a modulation signal generator providing control signals to the phase modulator and the polarization modulator. The receiver comprises a first stage carrying out the heterodyne detection of the phase component and the phase quadrature component of the polarization of the signal received through an optical fiber, a second stage demodulating the received signal to provide the multilevel signal, and a processing circuit comparing the received multilevel signal with predetermined reference signals. Such a system exploits the four degrees of freedom of the electromagnetic field propagating through the optical fiber so as to more closely approach the theoretical Shannon limit compared with conventional systems.

8 Claims, 4 Drawing Sheets

5,416,628

MULTILEVEL COHERENT OPTICAL SYSTEM

BACKGROUND OF THE INVENTION

1. Field of the Invention

The present invention relates to the communication systems using optical signals propagating through single-mode optical fibres and, in particular, a method of and an apparatus for generating, transmitting and receiving a multilevel optical signal.

2. Description of the Related Art

Reliable and economically competitive, coherent optical transmission systems which can be made available at short and medium terms allow novel network architectures to be provided regarding long-distance and high-performance connections and multi-user LAN (Local Area Network) and MAN (Metropolitan Area Network) connections as well. In particular, the very large bandwidth of the single-mode optical fibres (thousands of GHz) can be suitably exploited by providing optical FDM-systems (Frequency Division Multiplexing) in which the selection of the desired channel can be obtained by shifting the frequency of the local oscillator. This allows passive optical networks with very high traffic capacity (thousands of gB/s) to be carried out. However, two important aspects restrict on one hand the bandwidth of the single channel and limit on the other hand the maximum number of channels which can be tuned by the user. In the first instance, in fact, the main restriction is due to the bandwidth of the photodiodes and the electronic circuits, while regarding the second instance it should be considered that the frequency range which can be tuned by the user depends on the tunability characteristics of the laser used as local oscillator.

In order to increase the information rate of any channel, systems have been provided in which the information to be transmitted is coded with more than two levels instead of being coded using only the two binary levels as it is customary for providing a high signal reception sensitivity. By transmitting multilevel signals an improvement of spectrum efficiency expressed in terms of information rate per unit of occupied band is obtained at the cost of a reduction of the sensitivity. The known systems with two or more levels resort to the digital amplitude and phase keying (APK) or to the digital phase shift keying (PSK) or polarization shift keying (SPSK) of the electrical component of the electromagnetic field associated to a coherent optical wave generated by a laser source.

In particular, according to the previous state of art, EP-A-0 277 427 discloses methods of an devices for processing an optical signal by altering the polarization state thereof under control of a signal at a predetermined scrambling frequency.

EP-A-0 280 075 discloses an optical low-noise superheterodyne receiver for modulated optical signals in which a received light signal is coupled to a coherent light signal having the same polarization. Then such signals are combined so as to provide two pairs of optical signals, the signal of each pair having the same polarization perpendicular to that of the other pair, and fed to photoelements which provide electrical signals. Such electrical signals are then summed to each other after demodulation and after at least a phase shifting of one of such signals.

In "Electronics Letters" Vol. 26, No. 4 of 15 Feb. 1990 there is disclosed the performance of coherent optical transmission systems using multilevel polarization modulation based upon equipower signal constellations at the vertices of regular polyhedra inscribed in to the Poincare's sphere.

SUMMARY OF THE INVENTION

The present invention seeks to provide a method of generating a multilevel signal with a better performance than the known systems with regard to the signal reception sensitivity on the same number of employed levels. Within such general aim the invention seeks to provide in particular a transmitting and a receiving apparatus carrying out the above mentioned method.

BRIEF DESCRIPTION OF THE DRAWINGS

Such aims are achieved by the invention defined and characterized in general in the claims attached to the following description in which the present invention is disclosed by way of a non-limitative example with reference to the accompanying drawing, in which:

DETAILED DESCRIPTION OF THE PREFERRED EMBODIMENTS

Figure 1:
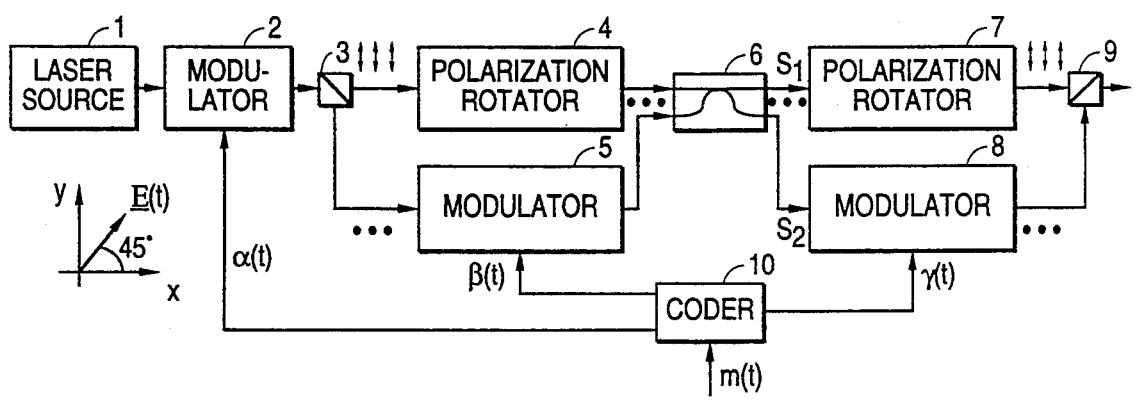
FIG. 1 is a block diagram of a transmitting apparatus for a multilevel optical signal according to the present invention.

The electrical field E(t) of an electromagnetic wave having angular frequency $\omega_o$ and propagating through a single-mode optical fibre can be written as follows:

$$E(t) = E_x(t)x + E_y(t)y = (x_1 + ix_2)x + (x_3 + ix_4)y \, e^{i\omega_o t}$$

where the phase terms $x_1$ and $x_3$ and the phase quadrature terms $x_2$ and $x_4$ are the components on the reference axes x and y of the polarization state, i.e. the vector representing the electrical field according to a given polarization. Vector $X=(x_1, x_2, x_3, x_4)$ can be associated to any state of such electromagnetic field, the components of which being such that:

$$x_1^2+x_2^2+x_3^2+x_4^2=P$$

where P is the transmitted optical power;

The schematic block diagram of a transmitter according to the invention is shown in FIG. 1: a laser source 1 generates a linearly polarized optical carrier having a frequency, for example, of $10^{14}$ Hz, so as to form an angle of 45° with respect to the reference axes x and y. The phase of such optical field is modulated by a phase modulator 2 with a message, for example a voltage having a time variable amplitude $\alpha(t)$, which is generated by a coder 10 from a binary sequence m(t) representing an information to be transmitted. After the phase modulation the components of the polarization state on axes x and y are split by a polarization selection beam splitter 3. It should be noted that the reference axes x and y are defined by the orientation of splitter 3. In the upper branch the polarization of the signal is rotated by 90° by a polarization rotator 4 so as to align it with that of the signal in the lower branch. The phase of the latter signal is modulated by a modulator 5 with a message $\beta(t)$ also generated by coder 10. The two signals having the same polarization are mixed by a directional coupler 6, the outputs of which will be as follows:

$$s_1(t)=A/2\, e^{j[\omega_0 t+\alpha(t)]} [e^{j\beta(t)}+e^{j\pi/2}]$$

$$s_2(t)=A/2\, e^{j[\omega_0 t+\alpha(t)]} [e^{j\beta(t)+j\pi/2}+1]$$

where $A^2$ is proportional to the transmitted optical power. The polarization state of signal $s_1$ is then rotated by 90° by a polarization rotator 7' so as to make it orthogonal to that of signal $s_2$, the phase of which is modulated by a modulator 8 with a message $\gamma(t)$ generated by coder 10. The resulting signals are then coupled by a polarization selection directional coupler 9 to provide the optical signal to be transmitted through the fibre, the x and y polarization components of which have the following phase terms and phase quadrature terms:

$$x_1 = A\cos[\beta(t)/2 + \pi/4]\{\cos[\alpha(t) + \beta(t)/2 + \pi/4]\cos\gamma(t) +$$
$$-\sin[\alpha(t) + \beta(t)/2 + \pi/4]\sin\gamma(t)\}$$
$$x_2 = A\cos[\beta(t)/2 + \pi/4]\{\cos[\alpha(t) + \beta(t)/2 + \pi/4]\sin\gamma(t) +$$
$$-\sin[\alpha(t) + \beta(t)/2 + \pi/4]\cos\gamma(t)\}$$
$$x_3 = A\sin[\beta(t)/2 + \pi/4\, \cos[\alpha(t) + \beta(t)/2 + \pi/4]$$
$$x_4 = A\sin[\beta(t)/2 + \pi/4\, \sin[\alpha(t) + \beta(t)/2 + \pi/4]$$

where the function $\alpha(t)$, $\beta(t)$ and $\gamma(t)$ can have values between 0 and $2\pi$ according to the selected codification method.

In particular, such functions are generated by coder 10 according to the following criteria. A succession of bits representing the information to be transmitted are fed into coder 10. Such succession is divided in groups of bits, each group of bits representing a symbol of the alphabet used by the coder. Thus the succession of bits is transformed in a succession of symbols. In case a N-level signal is transmitted and, for the sake of semplicity, under the assumption that N is a power of 2, each symbol is formed by m bits where $m=2 \log N$. Each symbol can be univocally associated to a point of the sphere in the four-dimensional space in which the electromagnetic field is represented, such point being determined by the vector $X=(x_1, x_2, x_3, x_4)$ or by a tern of generalized spherical coordinates $\alpha$, $\beta$ and $\gamma$ and by the radius of the sphere, i.e. the square root of the transmitted optical power. Therefore, the transmission of a symbol corresponds to the transmission of a well defined state of the electrical field. As the succession of bits m(t) are fed into the coder, an association between symbols and points at the coordinates $\alpha$, $\beta$ and $\gamma$ is effected; the latter are then entered into a digital-to-analog converter and transformed to the voltages $\alpha(t)$, $\beta(t)$ and $\gamma(t)$ which are the control signals of the demodulators 2, 5 and 8. It should be noted that the states of the electrical field are completely determined by the three angular coordinates as the transmitted optical power in the apparatus of FIG. 1 remains constant.

Figure 2:
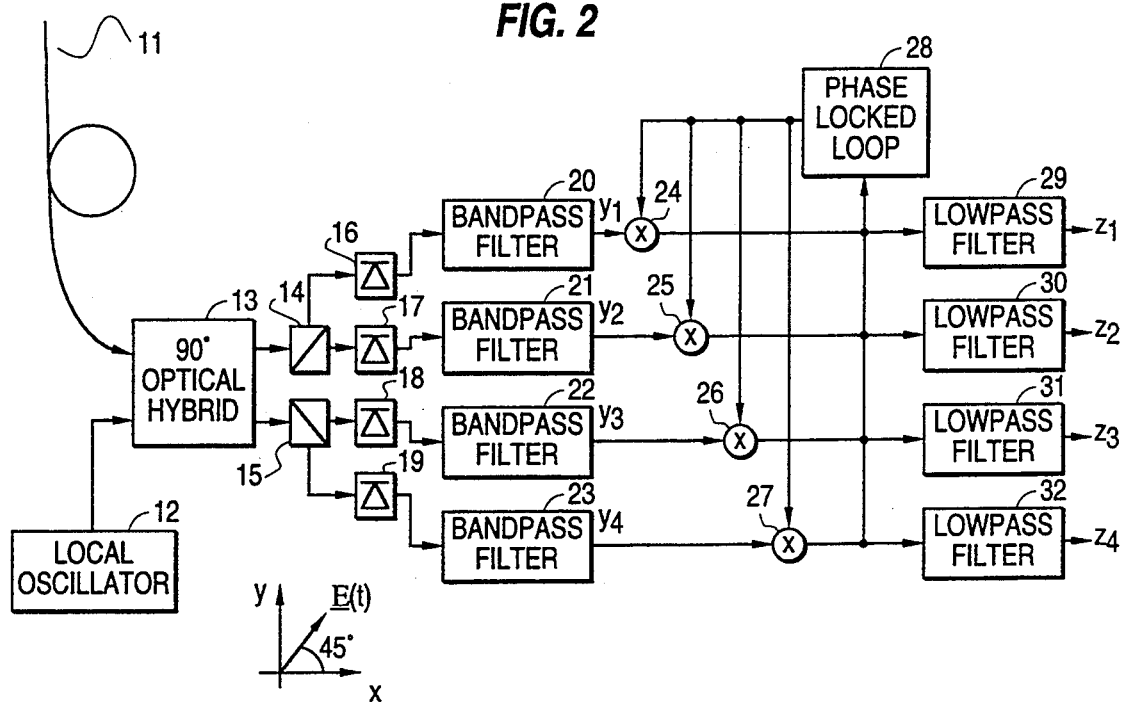
FIG. 2 is a block diagram of the detecting stage and the intermediate frequency stage of a receiving apparatus according to the invention.

The block diagram of the stage detecting the optical signal and of the intermediate frequency stage of a receiving apparatus according to the invention is shown in FIG. 2.

The optical signal modulated in phase and polarization and generated by a transmitter of the type shown in FIG. 1 and transmitted through a single-mode fibre 11 is entered into a "90° optical hybrid" 13 along with a coherent optical signal generated by a laser source operating as local oscillator 12. Such signal of the local oscillator having a frequency which differs from that of the transmitted signal carrier by a predetermined amount between $10^8$ and $10^9$ Hz is linearly polarized at 45° with respect to the reference axes x and y. The 90° optical hybrid 13 is a known device having two inputs and two outputs and providing at one output the sum of the input signals and at the other output the sum of one input signal and the other input signal the phase of which is shifted by 90°. In such a case, therefore, the output signals are the phase component and the phase quadrature component of the beat signal.

The x and y components of the polarization state of the output signals of the optical hybrid 13 are then split by polarization selection beam splitters 14 and 15 defining with their orientations the reference axes x and y, and separately detected by four photodiodes 16, 17, 18 and 19. The four electrical intermediate frequency signals are then filtered by bandpass filters 20, 21, 22 and 23 centered about the intermediate frequency and having a double as high bandwidth as the figure rate $R_s$, i.e. the inverse of the transmission time of a symbol. A phase locked loop (PLL) 28 and four multipliers 24, 25, 26 and 27 allow the four intermediate frequency signals $y_1$, $y_2$, $y_3$ and $y_4$ at the outputs of the filters 20–23 to be translated to base band. Such signals are then fed to four lowpass filters 29, 30, 31 and 32 having the same bandwidth as the figure rate $R_s$ so as to provide four base band signals $z_1$, $z_2$, $z_3$ and $z_4$ proportional to the estimated values of the components of vector X which are mainly impaired by the detection noise.

Two preferred embodiment of the processing apparatus have been proposed for providing and updating the estimated values of the components of vector X from the base band signals $z_1$, $z_2$, $z_3$ and $z_4$. Such apparatus allow the fluctuations of the polarization state of the optical signal due to the propagation through a single-mode fibre to be compensated by merely electronic techniques.

Figure 3:
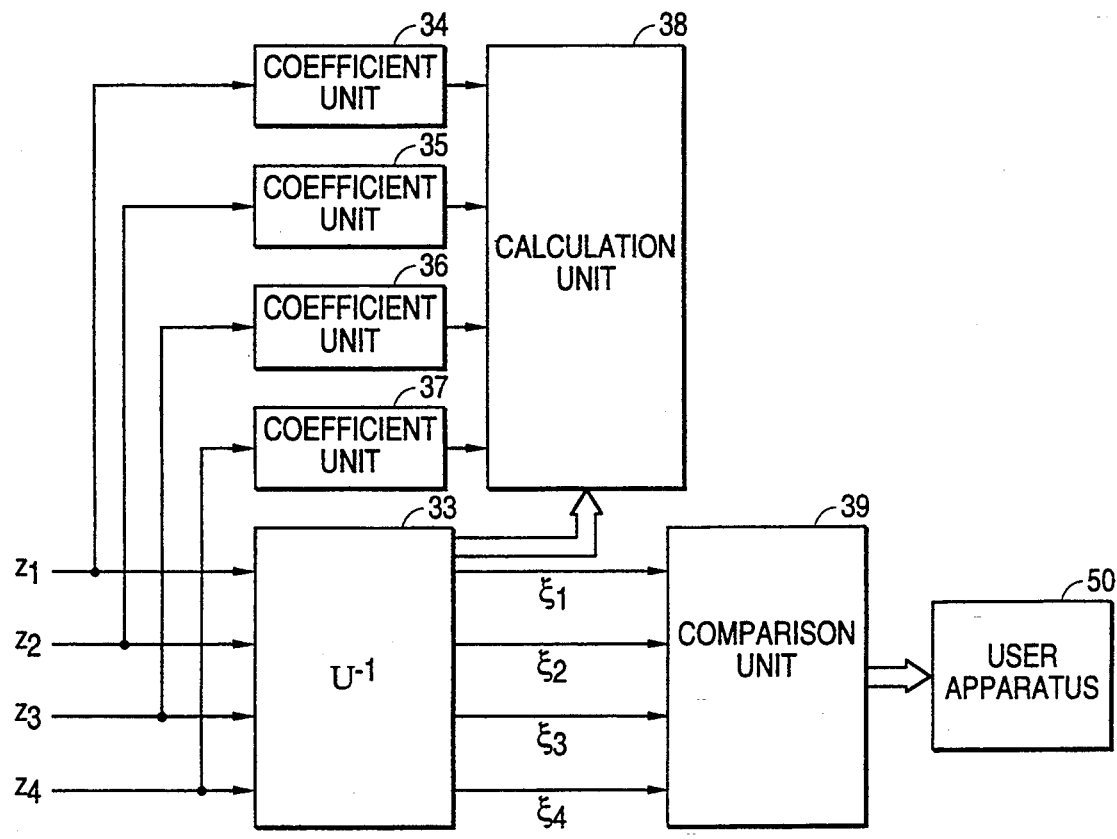
FIG. 3 is a block diagram of a multilevel signal processing stage based on the determination of the coefficients of the inverted Jones matrix in a receiving apparatus according to the invention.

The operation of the first apparatus, the block diagram of which is shown in FIG. 3, is based on the determination of the inverse Jones matrix. As it is known, the effects due to the propagation through a single-mode optical fibre can be taken into account by the Jones unit operator providing the input-output relation between the polarization states of the optical field. Since such relation is linear, the application of the inverse Jones operator to the received signal allows the polarization state of the transmitted optical signal to be determined. Vector Z having the base band signals $z_1$, $z_2$, $z_3$ and $z_4$ as components is multiplied in Unit 33 by the inverse Jones matrix $U^{-1}$ so as to provide the estimated values of the components of vector X. The coefficients of the matrix are determined by an algorithm based upon the consideration that the fluctuations of the polarization state (0, 1–1 Hz) due to the fibre birefringence are much slower than the figure rate (10–1000 Hz). The algorithm is implemented on the base of the calculation of the time averages of the signals $z_1$, $z_2$, $z_3$ and $z_4$ at coefficient units 34, 35, 36 and 37 in time intervals much longer than the symbol period. i.e. the transmission time of a symbol, and much shorter than the characteristic period of the polarization fluctuations. The elements of the Jones matrix depend linearly on the averages of the signals $z_1$, $z_2$, $z_3$ and $z_4$, as the coefficients of such linear relation are the averages of the four coordinates of the reference points evaluated in the set of the N feasible transmitted symbols and stored in calculation unit 38. Therefore, if the averages of the signals $z_1$, $z_2$, $z_3$, $z_4$ are known, a linear system of four equations with four unknown values can be implemented, the solution of which calculated in calculation unit 38 provides the real and imaginary parts of the coefficients of the Jones matrix, the inverse of which is then calculated in unit 33. This algorithm causes the coefficients of the Jones matrix to be uptodated at the end of any time period at which the time averages of the signals $z_1$, $z_2$, $z_3$ and $z_4$ are evaluated, thus allowing the apparatus to follow the fluctuations of the polarization state due to the single-mode fibre birefringence. The decision, i.e. the recognition of the state of the multilevel signal received at a given time, is effected in comparison unit 39 by comparing the estimated vector $\epsilon$ of components $\epsilon_1$, $\epsilon_2$, $\epsilon_3$ and $\epsilon_4$ with the reference vectors corresponding to the feasible transmitted symbols, the components of which have been stored in unit 39 when adjusting the apparatus. In particular, such comparison is effected by calculating the distances between the point on the surface of the sphere in the four-dimensional space corresponding to the estimated vector $\epsilon$ and the points determined by the reference vectors. Among the feasible transmitted symbols it is selected the symbol corresponding to the point determined by the reference vector having the shortest distance from the point of coordinates $\epsilon_1$, $\epsilon_2$, $\epsilon_3$ and $\epsilon_4$. The output signal of unit 30 is fed to an User apparatus 50.

Figure 4:
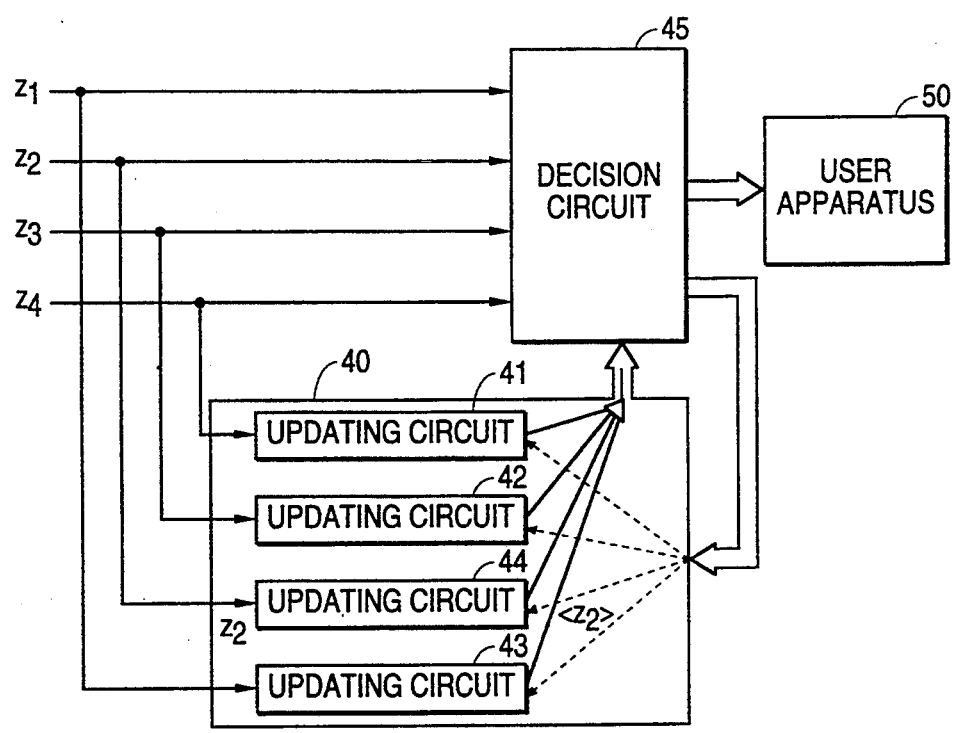
FIG. 4 is a block diagram of a multilevel signal processing stage based upon an algorithm for providing and uptodating the values of the components of the reference vectors in the receiving apparatus of the invention.
Figure 5:
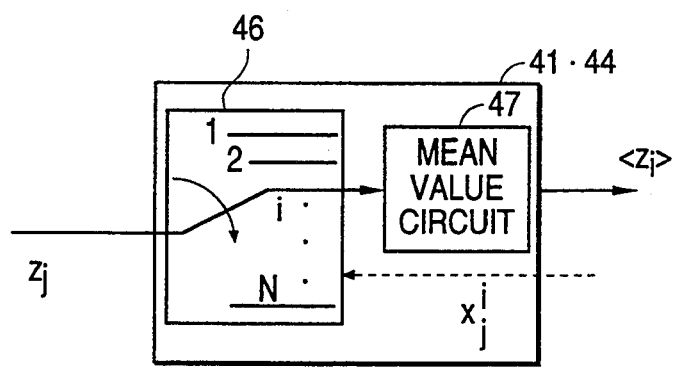
FIG. 5 is a block diagram of the circuit of the stage of FIG. 4 for uptodating the values of the components of the reference vectors.

The operation of the second apparatus processing the multilevel signal is on the contrary based upon an algorithm allowing the values of the coordinates of the reference points to be initially determined and uptodated. i.e. the components of the reference vectors on the surface of the sphere in the four-dimensional Euclidean space. The schematic block diagram of such processing apparatus is shown in FIG. 4. The apparatus determines initially the reference vectors by means of a suitable initialization sequence and subsequently effects the continuous uptodating of the components of such vectors, the values of which are fed to decision circuit 45 in which a decision is taken by the above described procedure based upon the calculation of the distance between the point corresponding to the received symbol and the reference points. The decision circuit 45 in case of a N-level signal has 4N memory cells in which the components of the N reference vectors are stored. In the time interval between two successive uptodatings the decision circuit 45 estimates the received symbol and associates it to any of the N symbols which can be transmitted. The uptodating of the components of any reference vector is carried out by calculating the mean value of the vector components which are estimated by the decision circuit during the uptodating interval as corresponding to that reference vector. At the end of any uptodating interval, which is chosen also in this case much shorter than the characteristic periods of the polarization fluctuations and much longer than the symbol period, the reference vectors are replaced by those corresponding to the novel components, the mean values of which calculated by the above described method have been stored in the 4N memory cells.

In the diagram of FIG. 4 the uptodating operation is effected by updating 40 formed of four circuits 41, 42, 43 and 44, each of them comprises a switch 46 and N mean value circuits 47 for the calculation of the mean value of the signal selected by the switch. After having estimated the received symbol, the decision circuit 45 supplies the control signal formed of the components of the reference vector corresponding thereto to the four blocks 41, 42, 43 and 44. Such control signal causes any base band signal $z_1$, $z_2$, $z_3$ and $z_4$ to be entered through switch 46 into circuit 47 for the calculation of the mean value corresponding to the reference symbol selected by the decision circuit 45 among N feasible symbols which can be transmitted. Therefore, during the uptodating interval the outputs of the circuits 41, 42, 43 and 44 supply the signals which are to be used at the uptodating time to calculate the mean values of the components of the novel reference vectors which are then stored in the 4N memory cells of the decision circuit 45. The resulting processing signal of block 45 is supplied to an user apparatus 50.

The performance of the apparatus has been valued in view of the statistics of the detection noise. In order to optimize the performance, the reference states of the transmitted optical field have been selected such as to reduce to a minimum the optical power necessary to achieve a predetermined error probability. In case of a N-level signal such choise consists in determining the position of N reference points on the sphere of the four-dimensional Euclidean space. From an analytical point of view the optimization of the performance can be achieved by an algorithm which minimizes the multivariable function establishing the relationship between the error probability $P_e$ and the coordinates of the N reference points. The problem cannot be analytically solved in closed form so that a numeric algorithm has been used to minimize the above mentioned multidimensional function for $3 \leq N \leq 32$.

Some results regarding feasible configurations of N reference points obtained by the minimization algorithm of multi-variable functions and using the downhill simplex method are shown in the following tables I, II, III, IV.

TABLE I

| Level | $\phi^o$ | $\psi^o$ | $\theta^o$ |
|---|---|---|---|
| 1 | 0.00 | 0.00 | 0.00 |
| 2 | 182.65 | 75.52 | 0.00 |
| 3 | 117.70 | 124.54 | 161.56 |

TABLE I-continued

| Level | $\phi^o$ | $\psi^o$ | $\theta^o$ |
|---|---|---|---|
| 4 | 157.16 | 308.49 | 295.89 |
| 5 | 298.07 | 310.91 | 144.30 |

TABLE II

| Level | Level | | | | |
|---|---|---|---|---|---|
| | 1 | 2 | 3 | 4 | 5 |
| 1 | 0.000 | 1.581 | 1.581 | 1.581 | 1.581 |
| 2 | 1.581 | 0.000 | 1.581 | 1.581 | 1.581 |
| 3 | 1.581 | 1.581 | 0.000 | 1.581 | 1.581 |
| 4 | 1.581 | 1.581 | 1.581 | 0.000 | 1.581 |
| 5 | 1.581 | 1.581 | 1.581 | 1.581 | 0.000 |

TABLE III

| Level | $\phi^o$ | $\psi^o$ | $\theta^o$ |
|---|---|---|---|
| 1 | 0.00 | 0.00 | 0.00 |
| 2 | 180.00 | 0.00 | 0.00 |
| 3 | 57.43 | 90.00 | 0.00 |
| 4 | 113.52 | 2.43 | 90.00 |
| 5 | 212.56 | 270.00 | 0.00 |
| 6 | 122.57 | 270.00 | 180.00 |
| 7 | 211.76 | 332.02 | 270.00 |
| 8 | 327.42 | 90.00 | 180.00 |

TABLE IV

| Level | Level | | | | | | | |
|---|---|---|---|---|---|---|---|---|
| | 1 | 2 | 3 | 4 | 5 | 6 | 7 | 8 |
| 1 | 0.000 | 2.000 | 1.414 | 1.414 | 1.414 | 1.414 | 1.414 | 1.414 |
| 2 | 2.000 | 0.000 | 1.414 | 1.414 | 1.414 | 1.414 | 1.414 | 1.414 |
| 3 | 1.414 | 1.414 | 0.000 | 1.414 | 1.414 | 2.000 | 1.414 | 1.414 |
| 4 | 1.414 | 1.414 | 1.414 | 0.000 | 1.414 | 1.414 | 2.000 | 1.414 |
| 5 | 1.414 | 1.414 | 1.414 | 1.414 | 0.000 | 1.414 | 1.414 | 2.000 |
| 6 | 1.414 | 1.414 | 2.000 | 1.414 | 1.414 | 0.000 | 1.414 | 1.414 |
| 7 | 1.414 | 1.414 | 1.414 | 2.000 | 1.414 | 1.414 | 0.000 | 1.414 |
| 8 | 1.414 | 1.414 | 1.414 | 1.414 | 2.000 | 1.414 | 1.414 | 0.000 |

In particular Table I shows the values of the angular coordinates $\phi$, $\Psi$ and $\theta$ corresponding to the points of the sphere of the four-dimensional Euclidean space having standardized unit radius which are associated to the reference states of the electromagnetic field in case of an optimized five-level configuration. The angular coordinates are bound to the components $x_1$, $x_2$, $x_3$ and $x_4$ defining the state of the electromagnetic field by the following relations:

$x_1 = \cos \phi \cos \Psi \cos \theta$ $x_2 = \cos \phi \cos \Psi \sin \theta$ $x_3 = \cos \phi \sin \Psi$ $x_4 = \sin \phi$ Table II shows the values of the distances between the reference points on the sphere of standardized unit radius in case of a five-level configuration; in this case the distance of any couple of points is the same, and when that result is obtained, that is the best for simmetry reasons.

Table III shows the values of the angular coordinates $\phi$, $\Psi$ and $\theta$ corresponding to the points on the sphere of the four-dimensional Euclidean space having standardized unit radius which are associated to the states of the electromagnetic field in case of an eight-level configuration.

Table IV shows the values of the distances between the reference points on the sphere having standardized unit radius in case of an eight-level configuration. In such case it was not possible to arrange the eight reference points on the four-dimensional sphere in such a way that they are at the same distance from one another. Nevertheless the optimum configuration has a high simmetry as any point has six first near points at a distance equal to the radius of the sphere multiplied by $\sqrt{2}$ and only one second near point at a double as high distance as the radius of the sphere.

Figure 6:
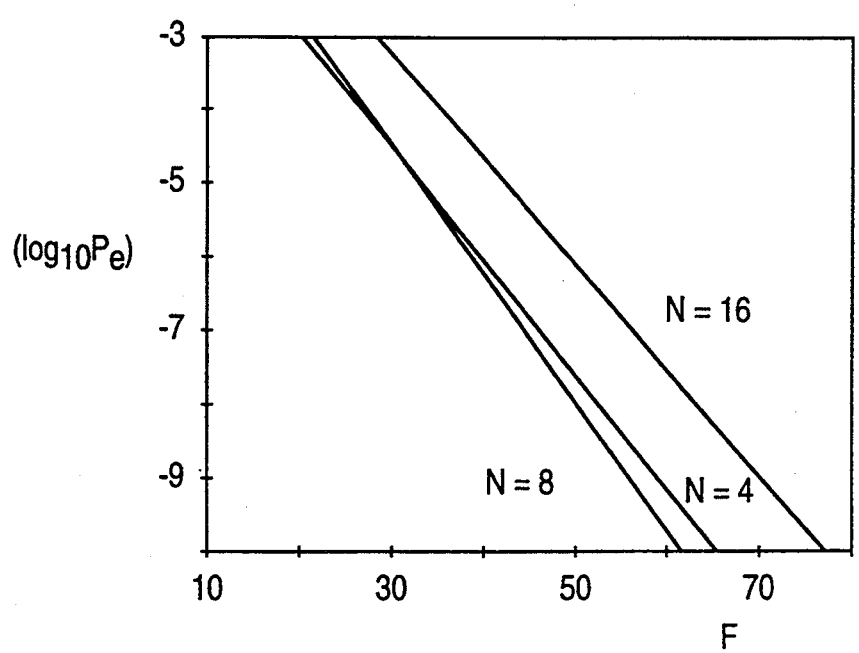
FIG. 6 is a diagram of the logarithm of the error probability $P_e$ versus the number of the received photons per bit F for different values of the level number N.

In FIG. 6 the performance of the apparatus is shown by the logarithm of the error probability $P_e$ versus the photon number per bit F for a number N of levels equal to 4.8 and 16, respectively.

Figure 7:
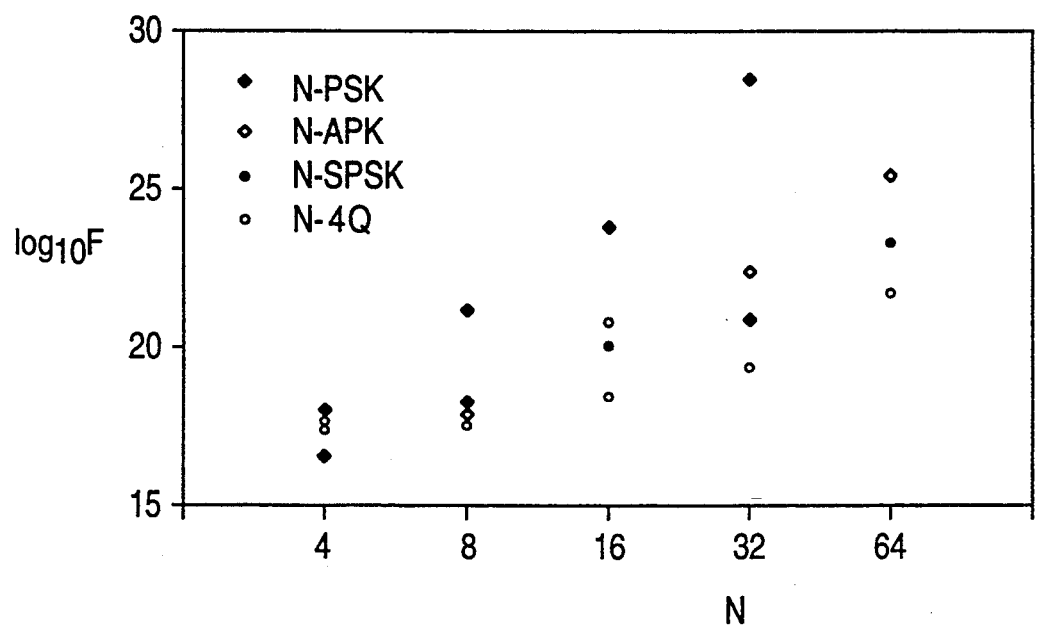
FIG. 7 is a graph for the comparison of the sensitivity of the receiving apparatus (N-4Q) according to the invention, expressed in terms of the logarithm of the number of received photons per bit F versus the level number N, with the sensitivity of a N-PSK apparatus (N-level Phase Shift Keying), a N-APK apparatus (N-level Amplitude and Phase Keying), and a N-SPSK apparatus (N-level Polarization Shift Keying with detection by Stokes parameters)

In FIG. 7 the sensitivity of the apparatus is shown by the logarithm of the photon number per bit versus the number N of levels at an error probability of $10^{-9}$. In such figure the performance of the apparatus according to the invention designated by N-4Q is compared with that of a N-level heterodyne PSK apparatus (N-PSK, N-Phase-Shift-Keying), a N-level heterodyne APK apparatus (N-APK, N-Amplitude-Phase-Keying), and a N-level polarization modulation apparatus with detection by Stokes parameters (N-SPSK, N-Stokes-Parameter-Shift-Keying), the former two being described in K. Feher "Digital MODEM Techniques", Advanced Digital Communications, Prentice-Hall Inc., Eaglewood Cliffs, N.J., 1987, the third one being described in an article of S. Betti, F. Curti, G. De Marchis, E. Iannone, "Multilevel Coherent Optical System Based On Stokes Parameters Modulation" which is being published on the Journal of Lightwave Technology.

Figure 8:
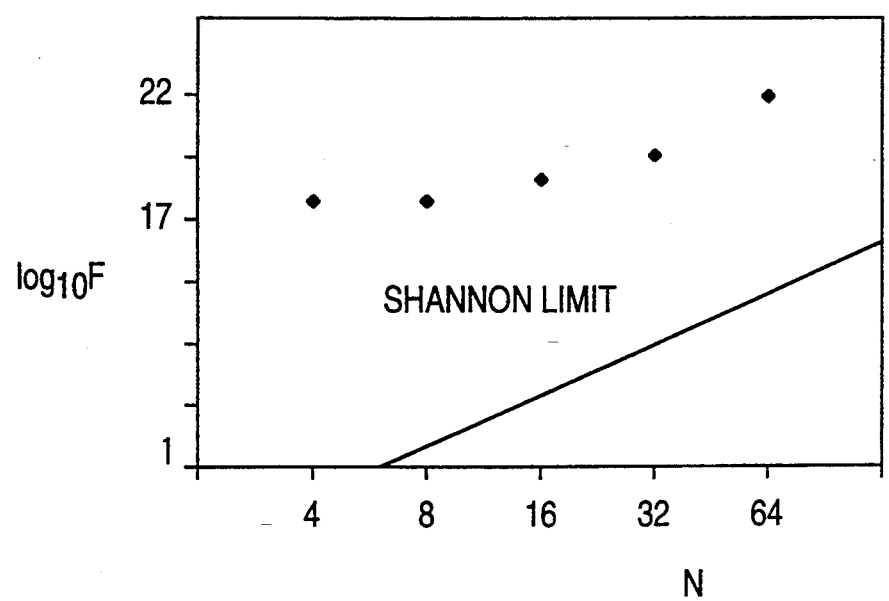
FIG. 8 is a graph for the comparison of the sensitivity of the receiving apparatus according to the invention, expressed in terms of the logarithm of the number of received photons per bit F versus the level number N, with the limit performance of the transmitting apparatus defined by the Shannon expression of the transmitting channel capacity.

In FIG. 8 the limit performance of the transmitting apparatus conditioned by the Shannon equation regarding the channel capacity is shown. The apparatus according to the invention suffers from a penalty with respect to the Shannon limit of 8.5 dB for N=16, 7.4 dB for N=32 and 7.8 dB for N=64, respectively. The performance of the apparatus according to the invention with respect to the compared apparatus tends to improve as the number of levels increases as illustrated in the following Table V showing the improvement in dB of the performance of the apparatus according to the invention with respect to that of N-SPSK and N-PSK apparatus.

TABLE V

| N | N-SPSK | N-PSK |
|---|---|---|
| 8 | 1.4 | 3.8 |
| 16 | 2.3 | 5.4 |
| 32 | 3.0 | 9.3 |
| 64 | 3.8 | 10.9 |

While only one embodiment of the invention has been illustrated and described, it should be appreciated that several changes and modifications can be made without parting from the scope of the invention.

What is claimed is:

1. A method of providing a multilevel signal on a coherent optical carrier in order to transmit information through a single-mode optical fiber by modulating the phase and the polarization of the carrier, comprising the steps of:

coding a first, second, and third control signal by coding a binary succession representing information to be transmitted and formed of a plurality of symbols each representing a predetermined state of the multilevel signal to be transmitted;

modulating the phase of the carrier with the coded first control signal;

dividing the modulated carrier into two signals having the same polarization;

modulating the phase of a first of the two signals with the coded second control signal;

mixing and dividing the modulated first signal and a second of the two signals into two orthogonal signals representing the polarization state;

modulating the phase of a first of said two orthogonal signals with the coded third control signal; and coupling the modulated first orthogonal signal and a second of the two orthogonal signals to produce an optical signal modulated in phase and in polarization.

2. The method of claim 1, further comprising the step of determining the predetermined states of the multilevel signal to be transmitted, each represented by components of a four-dimensional vector defining a reference point on a surface of a sphere of the four-dimensional Euclidean space having a radius equal to a square root of a transmitted optical mean power, by selecting the respective reference points to minimize a multi-variable function correlating a bit error probability with coordinates of said reference points.

3. An optical receiver for receiving a multilevel optical signal, comprising:

a first stage including an optical local oscillator to generate a coherent optical signal, a 90° optical hybrid to receive said multilevel optical signal and said coherent optical signal and to output a first signal, corresponding to a sum of the multilevel optical signal and said coherent optical signal, and to output a second signal, corresponding to a sum of the multilevel optical signal and said coherent optical signal with a phase of one of said multilevel optical signal and said coherent optical signal shifted by 90°, two beam splitters, each to separate said first and second signals, respectively, into orthogonal polarization component signals, and four photodiodes each to detect said separated component signals, said first stage coupled to an optical fiber to carry out a heterodyne detection of the phase terms and the phase quadrature terms of a beat signal generated from a polarized signal received by the optical fiber and the coherent optical signal, said first stage further including four bandpass filters centered about the intermediate frequency of the respective component signals detected by said four photodiodes;

a second stage coupled to said first stage to demodulate the received signals and to provide a multilevel signal, including means for converting the intermediate frequency signals of said four bandpass filters to respective four base band signals; and a processing circuit coupled to said second stage to compare said multilevel signal with predetermined reference signals.

4. The optical receiver of claim 3 for receiving a multilevel signal, wherein said processing circuit is based upon the evaluation of the inverse Jones matrix and comprises;

four circuits, each for respectively receiving at their inputs the four base band signals from the converting means, for calculating the time averages of said signals in time periods much longer than the symbol period and much shorter than the characteristic periods of the polarization fluctuations, and for supplying at their respective outputs four signals representing said time averages;

an inverse Jones matrix circuit for receiving at its input the four base band signals and supplying at its output corresponding estimated values of the transmitted multilevel signal; and a calculation circuit for receiving at its input the four signals representing the time averages of the base band signals and for comparing said time average signals with the feasible transmitted symbols forming the predetermined reference signals stored in the calculation circuit to calculate the coefficients of the Jones matrix and to supply them to the inverse Jones matrix circuit; and a comparing circuit for receiving at its input the estimated values of the transmitted multilevel signal and for comparing said estimated values with the feasible transmitted symbols stored in the comparing circuit to assign to each estimated value one of the feasible transmitted symbols.

5. The optical receiver of claim 3 for receiving a multilevel signal, wherein said processing circuit comprises:

first circuit means for initially determining the reference signals by an initialization sequence; and second circuit means for calculating time averages of the base band signals in time periods much longer than the symbol period and much shorter than the characteristic period of the polarization state fluctuations, and for storing and updating the components of the reference signals, the first circuit means further comparing the time averages of the base band signals with the reference signals and assigning to each of them one of the feasible transmitted symbols, the updating time period being much shorter than the characteristic period of the polarization fluctuations and much longer than the symbol period.

6. An optical transmitter for transmitting a multilevel optical signal modulated in phase and polarization, to transmit information through a single-mode optical fiber, comprising:

a coder to code a first, second and third control signal by coding a binary succession representing information to be transmitted and formed of a plurality of symbols each representing a predetermined state of the multilevel signal to be transmitted;

a coherent light source to generate an optical carrier;

a first phase modulator, connected to said coherent light source and said coder, to modulate a phase of the carrier with the coded first control signal;

a polarization selection beam splitter, connected to the first phase modulator, to split the modulated carrier into two components of the polarization state of the carrier;

a first polarization rotator, connected to the polarization selection beam splitter, to rotate the polarization of a first of the two components by 90°;

a second phase modulator, connected to the polarization selection beam splitter and said coder, to modulate a phase of a second of said two components with the coded second control signal;

a directional first coupler, connected to both the first polarization rotator and the second phase modulator, to superimpose the rotated first component with the modulated second component and to output a first and a second output signal, respectively;

a second polarization rotator, connected to the directional first coupler, to rotate the polarization of the first output signal by 90° so that the rotated first output signal is orthogonal to the second output signal;

a third phase modulator, connected to the directional first coupler and said coupler, to modulate a phase of the second output signal with the coded third control signal; and a second coupler, connected to the second polarization rotator and the third phase modulator, to couple the modulated second output signal with the orthogonal first output signal to produce an optical signal modulated in phase and polarization.

7. An optical transmitter for transmitting a multilevel optical signal modulated in phase and polarization, to transmit information through a signal-mode optical fiber, comprising:

a light source to generate a carrier;

a coder to code a plurality of control signals based on a binary succession of information to be transmitted and a predetermined state of the multilevel signal to be transmitted;

polarization and modulation means for modulating a phase of the carrier with one of said plurality of coded control signals, and for generating a first and a second signal from the modulated carrier, the first signal being orthogonal to the second signal and the second signal being further modulated with another one of said plurality of coded control signals; and a coupler to couple the first and second signals to generate an optical signal modulated in phase and polarization.

8. A method for transmitting a multilevel optical signal modulated in phase and polarization, to transmit information through a single-mode optical fiber, comprising the steps of:

generating a carrier;

coding a plurality of control signals based on a binary succession of information to be transmitted and a predetermined state of the multilevel signal to be transmitted;

modulating a phase of the carrier with one of said plurality of coded control signals;

generating a first and a second signal from the modulated carrier, the first signal being orthogonal to the second signal and the second signal being further modulated with another one of said plurality of coded control signals; and coupling the first and second signals to generate an optical signal modulated line in phase and polarization.

* * * * *

UNITED STATES PATENT AND TRADEMARK OFFICE
CERTIFICATE OF CORRECTION

PATENT NO.  : 5,416,628
DATED       : May 16, 1995
INVENTOR(S) : Betti et al

It is certified that error appears in the above-indentified patent and that said Letters Patent is hereby corrected as shown below:

Col. 1, line 52, delete "an" and insert --and--

Col. 1, line 67, delete "15" and insert --15th--

Col. 2, line 60, delete "E(t)" and insert --$\underline{E}$(t)--

Col. 2, line 64, in the equation underline "E" (first occurrence) and all occurrences of "x" and "y"

Col. 2, line 68, delete "x and y" and insert --$\underline{x}$ and $\underline{y}$--

Col. 3, lines 13, 20 and 22, delete "x and y" and insert --$\underline{x}$ and $\underline{y}$--

Col. 3, line 38, delete "7" and insert --7'--

Col. 3, line 44, delete "x and y" and insert --$\underline{x}$ and $\underline{y}$--

Col. 4, line 3, delete "x" and insert --$\underline{x}$--

Col. 4, lines 31, 39 and 43, delete "x and y" and insert --$\underline{x}$ and $\underline{y}$--

Col. 4, line 60, delete "x" and insert --$\underline{x}$--

UNITED STATES PATENT AND TRADEMARK OFFICE
CERTIFICATE OF CORRECTION

PATENT NO. : 5,416,628
DATED : May 16, 1995
INVENTOR(S) : Betti et al

It is certified that error appears in the above-indentified patent and that said Letters Patent is hereby corrected as shown below:

Col. 5, line 8, delete "z" and insert --$\underline{z}$--

Col. 5, line 9, delete "Unit" and insert --unit--

Col. 5, line 11, delete "x" and insert --$\underline{x}$--

Col. 5, line 53, delete "30" and insert --39--; delete "User" and insert --user--

Col. 5, line 65, delete "uptodating" and insert --updating--

Col. 6, lines 5, 8, 11, 13, 20, delete "uptodating" and insert --updating--

UNITED STATES PATENT AND TRADEMARK OFFICE
CERTIFICATE OF CORRECTION

PATENT NO. : 5,416,628
DATED : May 16, 1995
INVENTOR(S) : Betti et al

It is certified that error appears in the above-indentified patent and that said Letters Patent is hereby corrected as shown below:

Col. 6, line 21, after "updating" insert --circuit--

Col. 6, line 34, delete "updating" and inset --dating--

Col. 6, line 36, delete "uptodating" and insert --updating--

Col. 8, line 15, after "4" insert --,--

Col. 12, line 27, delete "line"

Signed and Sealed this

Nineteenth Day of September, 1995

*Attest:*

BRUCE LEHMAN

*Attesting Officer*     *Commissioner of Patents and Trademarks*